Feb. 24, 1925.

C. L. FLORA

STEERING ATTACHMENT

Filed Oct. 2, 1922

1,527,180

INVENTOR
Charles L. Flora
by
Owen Owen Crampton

Patented Feb. 24, 1925.

1,527,180

UNITED STATES PATENT OFFICE.

CHARLES L. FLORA, OF SYLVANIA, OHIO, ASSIGNOR TO WALTER STEWART, OF TOLEDO, OHIO.

STEERING ATTACHMENT.

Application filed October 2, 1922. Serial No. 591,683.

*To all whom it may concern:*

Be it known that I, CHARLES L. FLORA, a citizen of the United States, and a resident of Sylvania, in the county of Lucas and State of Ohio, have made an Invention Appertaining to a Steering Attachment; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a steering attachment for self-propelled vehicles of different kinds. It has for its object to provide a steering attachment which will coact therewith to reduce the road shock on the steering wheel and enable better control of the vehicle. Furthermore, the attachment embodying my invention is so constructed as to respond uniformly, notwithstanding the conditions that it is subjected to. The invention particularly has for its object to provide a means whereby the attachment may be readily connected to the steering mechanism of a Ford automobile or truck.

A structure containing the invention is illustrated in the accompanying drawings and is described hereinafter.

Figure 1:
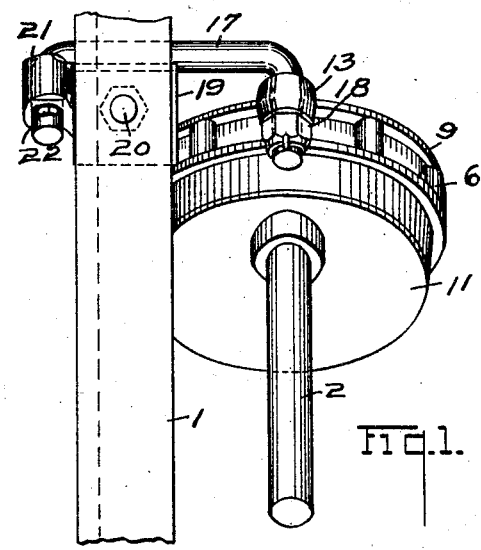
Figure 3:
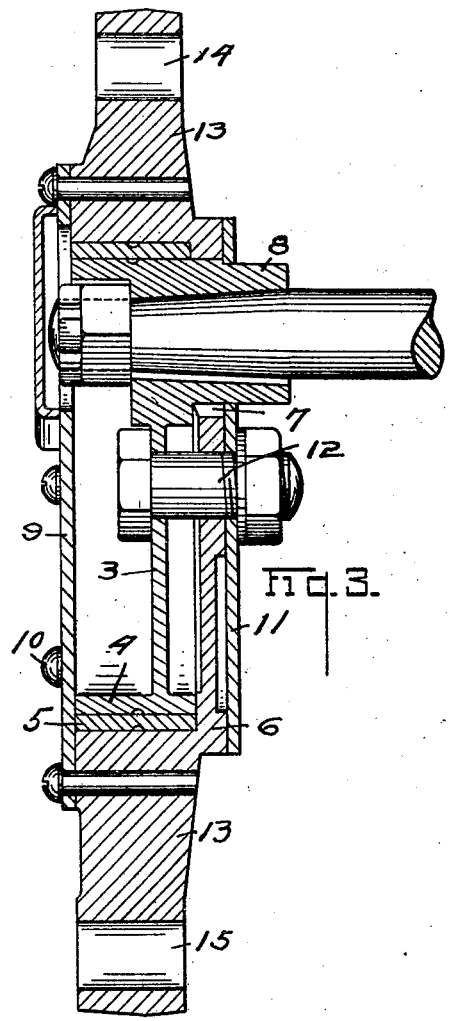
Figure 2:
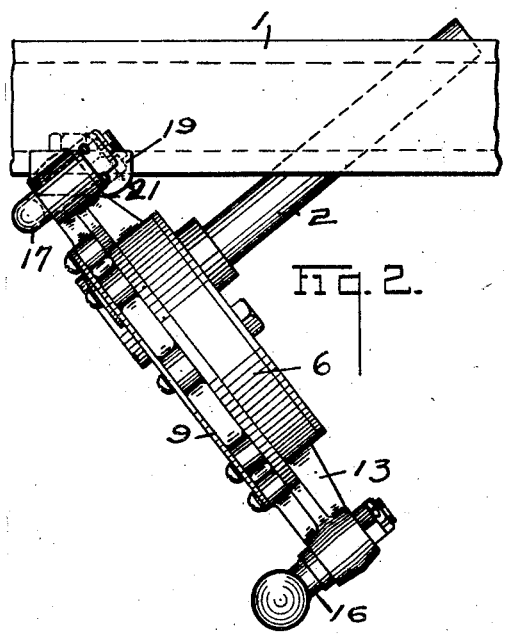

Figure 1 of the drawings illustrates a top view of the device attached to a side bar of the chassis of an automobile. Fig. 2 is a side view of the device, and Fig. 3 is a sectional view of part of the attachment.

In Figs. 1 and 2, 1 indicates the side bar of the chassis. 2 is the steering shaft to which the ordinary steering wheel is connected. The steering shaft is also connected by the usual bracket to the side bar 1 in the manner well known in connection with Ford automobiles.

The shaft 2 is eccentrically connected to a wheel 3 which is provided with a flange 4. A ring 5 having an inside diameter substantially the same as the outside diameter of the flange 4 is placed on the outside of the wheel 3. The width of the ring 5 is also the same as the flange 4. A housing 6 has a recess for receiving the wheel 3 and the ring 4. The inner diameter of the recess of the housing is substantially the same as the outer diameter of the ring 5. The housing 6 is also provided with an arcuate channel 7 in which is located the boss 8, the shaft 2 being keyed to the wheel 3 and located in the boss 8. The housing 6 is closed by a cover 9 that is secured by means of bolts or screws 10 to the housing, and also by the disc 11 that fits over the end of the boss 8. The wheel 3, the housing 6 and the disc 11 are secured by means of a bolt 12 that extends through the said parts at their centers. Thus the wheel 3 and the disc 11 are not only rotatively connected to the housing 6, but the parts of the mechanism are readily secured together by means of the bolt 12. Before closing the cover 9 upon the housing 6 the recess of the housing may be filled with grease or other lubricant in order to maintain a thorough lubrication of the parts.

The housing 6 is provided with ears or lugs 13 in which are located openings 14 and 15. The ears or lugs 13 are located diametrically opposite to each other and the line of the centers of the openings 14 and 15 also pass through the axis of the shaft 2 which is located at right angles to the line of the centers of the openings 14 and 15. A spherical headed bolt 16 is secured in the opening 15. The distance between the bolt 16 and the steering shaft 2 is the same as the distance between the head of the steering arm and the shaft of the ordinary Ford automobile. Thus the arm of the steering shaft may be removed and connection made with the steering gear through the steering link in the manner well known in the art.

In order that the upper end of the housing 6 may be rotatively secured in position to a fixed part of the automobile, and so that rotation of the shaft 2, which is eccentrically connected to the wheel 3, will cause rotative movements of the housing 6, a link is connected to the upper ear or lug 13 having the opening 14. The link 17 is bent at its ends and is inserted in the opening 14 and secured in position by means of a nut 18. A bracket 19 is secured to the underside of the frame 1 by means of the bolt 20 and is provided with an ear 21 having an opening for receiving the other end of the link 17. It is secured in position in the ear 21 by means of the cotter pin 22.

The link 17 provides a means not only for permitting rotation of the housing 6 about the end of the link to which it is connected, but also the link 17 gives any free vertical movement due to the rotation of the wheel 3 on the axis of the shaft 2 and relative to the housing 6, and thus prevents any binding as between the parts of the attachment.

By this arrangement an exceedingly efficient steering mechanism is provided which may be made at a low cost of production and is easily assembled, attached and operated.

I claim:

1. In a steering attachment for automobiles, a steering shaft, a pair of concentric members, a bolt for pivotally connecting the members together, the inner member connected eccentrically to the steering shaft, a link for connecting the outer member to a part of the machine and means for connecting the outer member on the side opposite to that to which it is connected to the machine, to the steering gear of the automobile.

2. In a steering attachment for automobiles, a steering shaft, a pair of concentric members, a bolt for pivotally connecting the members together, the inner member connected eccentrically to the steering shaft, a link for connecting the outer member to a part of the machine and means for connecting the outer member on the side opposite to that to which it is connected to the machine, to the steering gear of the automobile, and means for connecting the inner and outer members concentrically to each other.

3. In a steering attachment for automobiles, a steering shaft, a pair of concentric members, a bolt for pivotally connecting the members together, the inner member connected eccentrically to the steering shaft, means for pivotally connecting the outer member to a part of the machine, and means for connecting the outer member on the side opposite to that to which it is connected to the machine, to the steering gear of the automobile.

In testimony whereof, I have hereunto signed my name to this specification.

CHARLES L. FLORA.